2,780,912

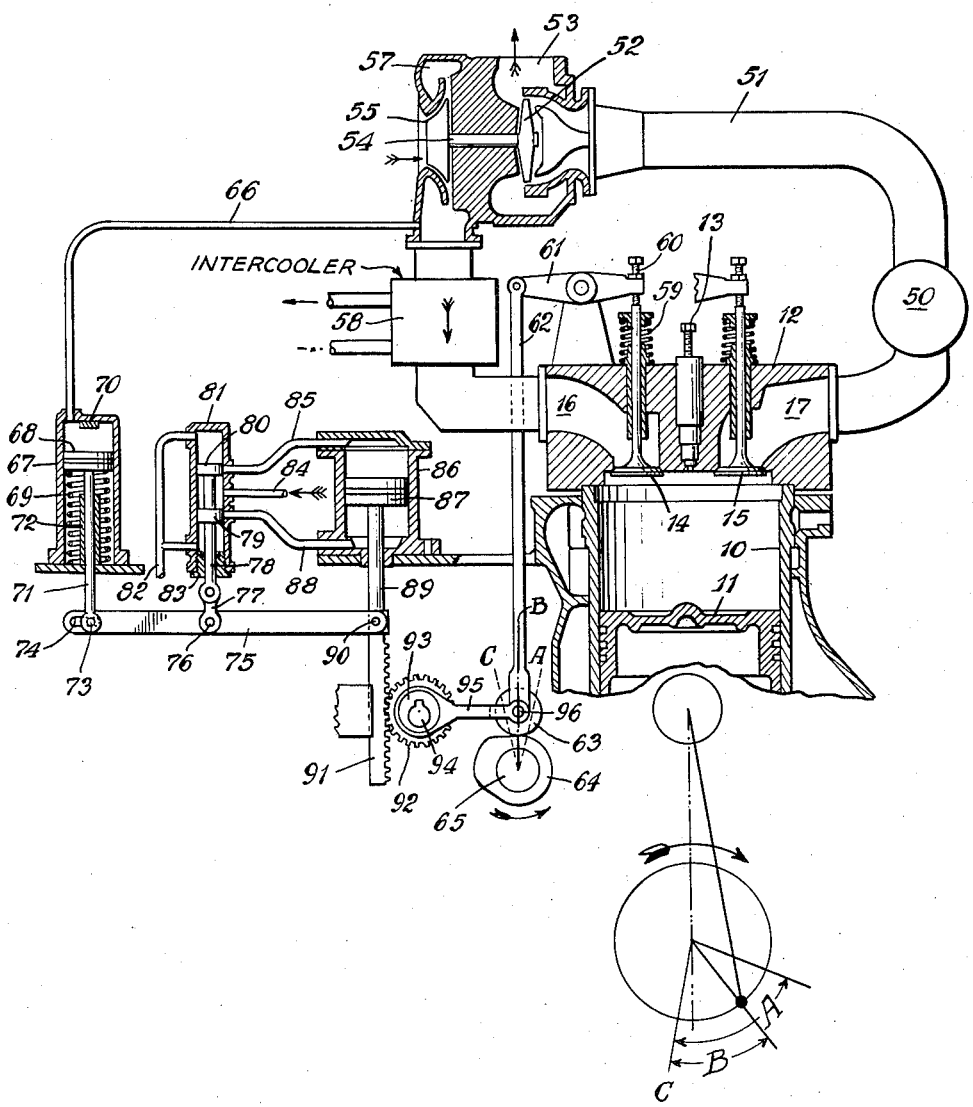

METHOD AND APPARATUS FOR VARYING THE FINAL COMPRESSION TEMPERATURE IN A FOUR CYCLE INTERNAL COMBUSTION ENGINE

Ralph Miller, Milwaukee, Wis.

Application August 17, 1951, Serial No. 242,371

12 Claims. (Cl. 60—13)

My invention relates to supercharged internal combustion engines of the compression ignition type. Although it is particularly applicable to diesel engines, it may also be applied to gas-fueled engines in which the combustible mixture of gas and air is compressed and then ignited by a small quantity of injected oil, to gas engines wherein other ignition means are provided and to Otto cycle engines.

It is already well known that the output of an internal combustion engine may be increased by the provision of a supercharger which compresses the charging air before it is passed into the cylinder or cylinders. This allows a greater quantity of fuel to be burnt and, in general, the output of the engine will be increased in proportion to the increase in pressure of the charging air.

The advantage of obtaining a higher engine output by means of a supercharger is offset to some extent at high supercharging pressures however by the necessity to construct the engine of stronger material so that it can stand up to the increased cylinder pressures and still have a substantial margin of safety. The larger the engine, the more important this consideration becomes and thus, additional expense is incurred as the supercharging pressure is increased.

Moreover, as the supercharging pressure is increased, so also is the temperature of the charging air. This gives rise in the conventional supercharged engine to a corresponding increase in the final compression temperature, that is to say, the temperature of the air within the cylinder at the end of a compression stroke. As a result, the thermal load imposed on the cylinder and parts surrounding the cylinder of a given engine can become excessive if the supercharging pressure is raised beyond a certain limit. Thus the increase in supercharging air temperature with increasing supercharging pressure tends to decrease the load which could otherwise be carried with higher supercharging pressure.

In the conventional engine, the effect of the means for cooling the supercharging air before it is passed into the cylinder or cylinders is limited by the temperature of the cooling medium. Under usual conditions, the best that can be hoped for is to take out the heat of compression of the supercharging air, so that intake manifold temperature remains constant independent of variation in supercharging pressure.

The temperature at the end of combustion is a function of the compression temperature and the quantity of fuel burned in the cylinder charge; thus reduction in compression temperature makes it possible to burn more fuel and increase engine load without dangerous overheating.

An aim of my invention is to provide a supercharged engine in which the final compression temperature decreases with increase in load. To accomplish this, I propose to decrease the rise in temperature from intake manifold temperature to final compression temperature resulting from compression in the cylinder so that as load increases, compression temperature falls and more fuel may be burned without exceeding safe combustion temperature.

According to my invention, the engine has a supercharger for supplying charging air at a pressure in accordance with the load on the engine and has means for cooling the charging air before it is passed into the cylinder or cylinders. In addition, it is provided with automatic control means for increasing or decreasing the compression in the cylinder or cylinders as the pressure of the charging air is decreased or increased respectively so that, in operation, the final compression temperature and the final compression pressure are maintained within predetermined limits.

Preferably, automatic control means operate so that the final compression pressure is maintained substantially constant whatever the value of the supercharging pressure.

It is thus possible in the engine in accordance with my invention to increase the mean effective pressure in the cylinder or cylinders without increasing the final compression pressure. Under some circumstances, the compression in the engine cylinder may be manually varied to maintain final compression pressure substantially constant.

The automatic control means for increasing or decreasing the compression in the cylinder or cylinders can take several different forms. For example, in a four-stroke engine, the said means may comprise an air intake valve for each cylinder which is operated through cam means which are automatically adjustable in accordance with variations in the supercharging pressure. The arrangement results in the valve being closed before the piston has reached the end of its suction stroke when the supercharging pressure is such that compression of the maximum permissible volume of air would increase the final compression pressure and/or final compression temperature beyond their predetermined limits. The higher the supercharging pressure, the earlier will be the moment at which the valve is closed during the suction stroke.

Another form of automatic control means, which can be applied to both two-stroke and four-stroke engines, comprises an exhaust valve for each cylinder which is automatically operated so that when the supercharging pressure is increased beyond a certain value, the closing of the exhaust valve is delayed until the piston is moving upwards on its compression stroke. The result is that some of the charging air is expelled from the cylinder before compression of the air actually begins.

A further form of automatic control means comprises an air intake valve for each cylinder which is automatically operated so that when the supercharging air is increased beyond a certain value, the closing of the valve is delayed until the piston is moving upwards on its compression stroke. The result is that some of the charging air is forced out of the cylinder back into the air intake duct.

If desired, the automatic control means can comprise a special discharge valve which is automatically operated so as to remain open during an initial part of the compression stroke when the supercharging pressure is increased beyond a certain value.

Thus, it will be seen that, in each of the cases outlined above, the final compression temperature is reduced at high supercharging pressures by reason of the fact that the compression in the cylinder or cylinders is reduced.

The compression in the cylinder or cylinders does not, of course, need to be reduced to the same extent at lower supercharging pressures. Indeed, at very low supercharging pressures it may be found that reduction of the compression to a large extent results in a final compression temperature which is too low to allow reliable ignition to take place. The engine in accordance with my invention is safeguarded against this contingency by reason of the fact that the compression is increased as the supercharging pressure decreases. The final compression pressure and final compression temperature are thus maintained above predetermined lower limits.

An apparatus for carrying out my improved method is illustrated diagrammatically in the attached drawing, but it will be obvious that many other arrangements might be used with equal effect.

10 is an engine cylinder, 11 a piston reciprocating therein, 12 the cylinder head, 13 the fuel injection nozzle, 14 the intake, and 15 the exhaust valves controlling intake port 16 and exhaust port 17.

An exhaust receiver 50 takes the hot gases from the cylinders, and 51 is an exhaust pipe to conduct exhaust gases through exhaust turbine wheel 52 to atmosphere at 53. 54 is a super-charging impeller driven by turbine wheel 52 through shaft 55. It draws air from atmosphere and forces it under pressure through manifold 57, cooler 58, intake port 16, into the cylinder 10.

The intake valve 14 with its spring 59, adjustable tappet 60, lever 61, reach rod 62 and cam roller 63 is actuated by the cam 64 on the cam shaft 65 driven by any suitable connection from the crank shaft.

Angular movement of the cam roller 63 about the shaft 65 through the angle A—C will vary the timing of the intake valve.

The mechanism to accomplish this in this case is depending on the pressure of the air discharged by the turbo-blower which in turn depends on the exhaust temperature which again in turn depends on the load carried by the engine. 66 is a duct leading from the blower shroud 57 to the cylinder 67. 68 is a piston in the cylinder 67 urged upwardly by the spring 69. 70 is a pad in the cylinder to limit the upward excursion of the piston 68. 71 is a piston rod guided by the sleeve 72. The pressure on the underside of the piston 68 is atmospheric. 73 is a pivot pin on the lower end of the piston rod 71 engaging a slot 74 in the lever 75. The lever 75 is pivoted at 76 to a link 77 which in turn is pivoted to a valve stem 78 carrying balanced piston valves 79 and 80 in the valve cylinder 81. The pipes 82 lead from the upper and lower ends of the valve cylinder to atmosphere. The valve stem 78 travels through the stuffing box 83. 84 is a pipe connected to the engine lubricating system and carrying engine oil lubricating pressure. It discharges into the cylinder 81. A pipe 85, controlled by the valve head 80, leads from the cylinder 81 to the upper end of the cylinder 86 above the piston 87 in that cylinder. The pipe 88 controlled by the valve head 79 leads from the valve cylinder 81 to the working cylinder 86 below the piston 87. The piston 87 carries a piston rod 89 pivoted at 90 to the lever 75. This rod also carries a rack 91 in mesh with a gear 92 carrying an eccentric 93 on a shaft 94 so that longitudinal movement of the rack 91 may rotate the gear 92 and so rotate the eccentric 93 in the yoke 95, the outer end of the yoke being pivoted at 96 to the pivot of the cam roller 63.

Starting with the parts in the position as the engine load increases, the turbine speed increases and so the air pressure in the shroud 57 increases, overcoming the spring 69, forcing piston 68 down. This causes the valves 79 and 80 to move downwardly connecting the upper end of the cylinder 86 with atmosphere and subjecting the lower end of the cylinder and the piston 87 to lubricating oil pressure. This causes the piston 87 to rise, rotates the gear 92 to move the cam roller 63 toward A and thus change the angle of advance of the intake cam to advance the time when the intake valve closes in consonance with the increase in air pressure as the load increases. Of course, the downward movement of the piston 87 results in returning the lever 75 to neutral position, closes the valves 79 and 80, closes the passages 88 and 85 and the apparatus is locked and held in the proper position until a change in air pressure occurs.

When the load decreases, the movement is in the opposite direction and the roller 63 is moved back toward C so as to retard the time of closing of the intake valve, thus again compensating for the reduction in pressure so that the temperature and pressure of the starting of the compression stroke will be returned to normal.

The means for supplying fuel could be the nozzle 13 or a suitable gas valve, in which case the usual spark plug would be required; and the control means therefor are not illustrated, as they are well known and their details form no part of the present invention.

I claim:

1. In a four-stroke cycle internal combustion engine adapted to operate over a selected load range, including a cylinder, a piston movably mounted in the cylinder, at least one inlet valve and inlet port for the cylinder to provide for the entrance of air to the cylinder, and at least one exhaust valve and exhaust port for the cylinder to provide for the exhaustion of burnt gases from the cylinder: a method of maintaining the temperature of the air in the cylinder at the beginning of compression at least no greater than the minimum load temperature of the selected load range, including the steps of precompressing the inlet air to an elevated temperature, specific weight, and pressure which vary in relation to the load on the engine so that the pressure, specific weight, and temperature will increase as the load increases and decrease as the load decreases, withdrawing the heat of precompression from the air by cooling it to a reduced temperature, supplying the precompressed cooled air to the cylinder, closing each inlet valve during the suction stroke of the piston so that the precompressed cooled air entrapped in the cylinder will be expanded to a reduced temperature and pressure before the beginning of compression by the piston, and varying the time of closing of each inlet valve during the suction stroke of the piston over the selected load range so that the amount of expansion will increase as the load increases and decrease as the load decreases over the load range.

2. The method of claim 1 in which the engine is spark fired.

3. The method of claim 1 in which the engine is operated on a diesel cycle.

4. In a four-stroke cycle internal combustion engine adapted to operate under varying load conditions, including a cylinder, a piston movably mounted in the cylinder, at least one inlet valve and inlet port for the cylinder to provide for the entrance of air to the cylinder, and at least one exhaust valve and exhaust port for the cylinder, to provide for the exhaustion of burnt gases from the cylinder: a method of varying the temperature of the air in the cylinder at the beginning of compression by the piston in inverse relation to the load on the engine over a selected load range including the steps of precompressing the inlet air to an elevated temperature, specific weight, and pressure which vary in relation to the load on the engine so that the pressure, specific weight, and temperature will increase as the load increases and decrease as the load decreases, withdrawing the heat of precompression from the air by cooling it to an approximately constant temperature while, at the same time, maintaining the pressure of the air approximately constant, supplying the precompressed cooled air to the cylinder, closing each inlet valve during the suction stroke of the piston so that the precompressed cooled air entrapped in the cylinder will be expanded to a reduced temperature and pressure before the beginning of compression by the piston, and varying the time of closing of each inlet valve during the suction stroke of the piston over the selected load range so that the amount of expansion will increase as the load increases and decrease as the load decreases over the load range.

5. The method of claim 4 in which the engine is spark fired.

6. The method of claim 4 in which the engine is operated on a diesel cycle.

7. In a four-stroke cycle internal combustion engine adapted to operate under varying load conditions including a cylinder, a piston movably mounted in the cylinder, at least one inlet valve and inlet port for the cylinder to provide for the entrance of air to the cylinder, at least one exhaust valve and exhaust port for the cylinder to provide for the exhaustion of burnt gases from the cylinder, an exhaust driven supercharger for precompressing the inlet air to an elevated temperature, specific weight, and pressure which vary in relation to the load on the engine so that the pressure, specific weight, and temperature will increase as the load increases and decrease as the load decreases, means for withdrawing the heat of precompression from the air by cooling it to a reduced temperature while, at the same time, maintaining the pressure of the air approximately constant, means for supplying the precompressed cooled air to the cylinder, means for closing each inlet valve during the suction stroke of the piston so that the precompressed cooled air will be expanded in the cylinder to a reduced temperature and pressure before the beginning of compression by the piston, and means for varying the time of closing of each inlet valve during the suction stroke of the piston over a selected load range, the time of closing being advanced as the load increases and retarded as the load decreases, so that the temperature of the air in the cylinder at the beginning of compression by the piston, over the selected load range, will be maintained at least no greater than the minimum load temperature of the selected load range.

8. The structure of claim 7 in which the engine is a spark fired engine.

9. The structure of claim 7 in which the engine is a compression ignition engine.

10. In a four-stroke cycle internal combustion engine adapted to operate under varying load conditions including a cylinder, a piston movably mounted in the cylinder, at least one inlet valve and inlet port for the cylinder to provide for the entrance of air to the cylinder, and at least one exhaust valve and exhaust port for the cylinder to provide for the exhaustion of burnt gases from the cylinder, an exhaust driven supercharger for precompressing the inlet air to an elevated temperature, specific weight, and pressure which vary in relation to the load on the engine so that the pressure, specific weight, and temperature will increase as the load increases and decrease as the load decreases, means for withdrawing the heat of precompression from the air by cooling it to an approximately constant temperature, means for supplying the precompressed cooled air to the cylinder, means for closing each inlet valve during the suction stroke of the piston so that the precompressed cooled air will be expanded in the cylinder to a reduced temperature and pressure before the begining of compression by the piston, and means for varying the time of closing of each inlet valve during the suction stroke of the piston over a selected load range, the time of closing being advanced as the load increases and retarded as the load decreases, so that the temperature of the air in the cylinder at the beginning of compression by the piston over the selected load range will vary in inverse relation to the load on the engine.

11. The structure of claim 10 in which the engine is a spark fired engine.

12. The structure of claim 10 in which the engine is a compression ignition engine.

References Cited in the file of this patent

UNITED STATES PATENTS

| | | |
|---|---|---|
| 2,097,883 | Johansson | Nov. 2, 1937 |
| 2,670,595 | Miller | Mar. 2, 1954 |

FOREIGN PATENTS

| | | |
|---|---|---|
| 601,965 | France | Dec. 16, 1925 |